(12) United States Patent    (10) Patent No.: US 12,383,062 B2
Chalfin et al.      (45) Date of Patent:    Aug. 12, 2025

(54) WALL PANEL FURNITURE SYSTEM

(71) Applicant: SAMUELSON GROUP INC., Paterson, NJ (US)

(72) Inventors: Michael Adam Chalfin, Wayne, NJ (US); Lawrence Mark Chalfin, Wayne, NJ (US); Michael Rinaldi, Bloomingdale, NJ (US)

(73) Assignee: SAMUELSON GROUP INC., Paterson, NJ (US)

( * ) Notice: Subject to any disclaimer, the term of this patent is extended or adjusted under 35 U.S.C. 154(b) by 43 days.

(21) Appl. No.: 18/427,957

(22) Filed: Jan. 31, 2024

(65) Prior Publication Data

US 2024/0251947 A1    Aug. 1, 2024

Related U.S. Application Data

(60) Provisional application No. 63/482,669, filed on Feb. 1, 2023.

(51) Int. Cl.
    *A47B 96/06*       (2006.01)
    *F16B 12/56*       (2006.01)
    *F16M 13/02*      (2006.01)

(52) U.S. Cl.
    CPC ............. *A47B 96/06* (2013.01); *F16B 12/56* (2013.01); *F16M 13/02* (2013.01); *F16B 2200/83* (2023.08)

(58) Field of Classification Search
    CPC ...... A47B 96/06; F16B 12/56; F16B 2200/83; F16M 13/02
    USPC ........................................ 248/206.5; 5/282.1
    See application file for complete search history.

(56) References Cited

U.S. PATENT DOCUMENTS 11,617,447 B2 *   4/2023   Clary .................... A47B 21/04
                                                                5/282.1
12,268,303 B1 *   4/2025   Merrill ................. A47B 96/028

* cited by examiner

*Primary Examiner* — Todd M Epps
(74) *Attorney, Agent, or Firm* — Riverside Law LLP

(57) ABSTRACT

A wall panel furniture system is described. A first wall panel has a front side, a back side, and an edge along a perimeter, where the edge includes a first vertical edge opposing a second vertical edge. A magnet is disposed along the first vertical edge. A first cleat is configured in a first recess disposed on a top portion of the back side. A bracket includes an elongate support connected to a plate having an opening adjacent to the elongate support. A piece of furniture includes first and second connection sections. Each connection section includes a slot opening to accept advancement of the elongate support, and an adjacent securement slot has a fastener, the securement slot is aligned with the opening adjacent to the elongate support when the elongate support is inserted into the slot opening. A furniture mounting system is also described.

20 Claims, 8 Drawing Sheets

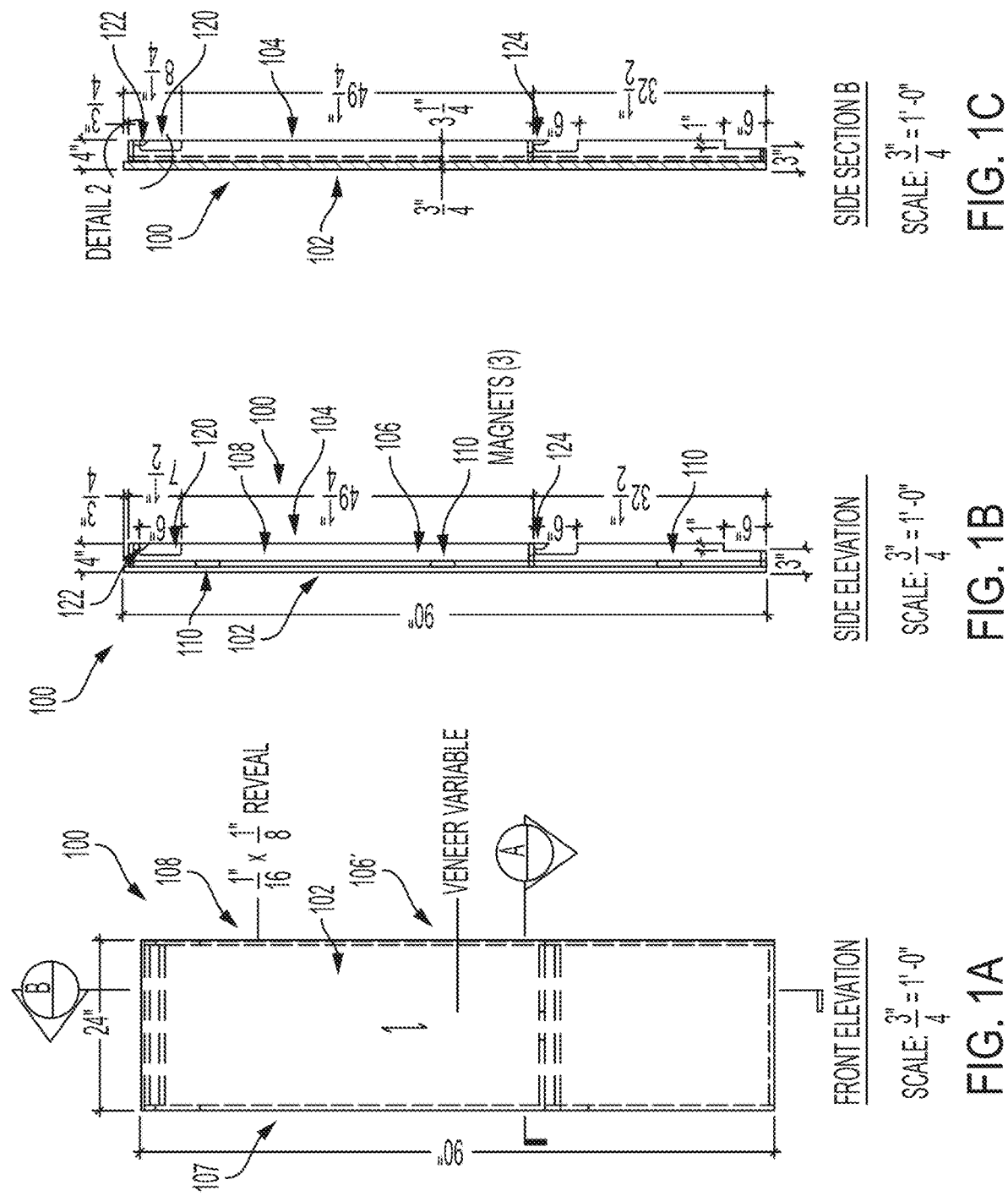

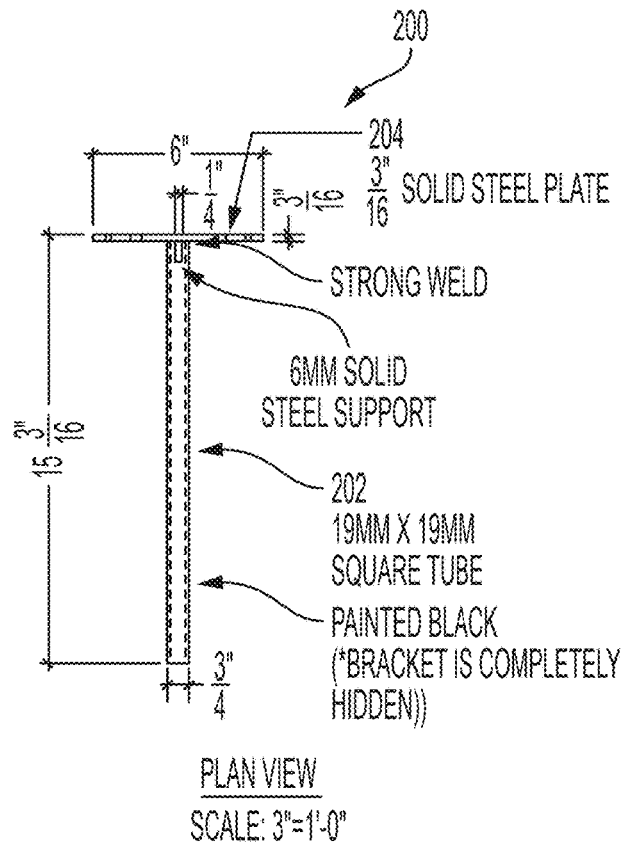
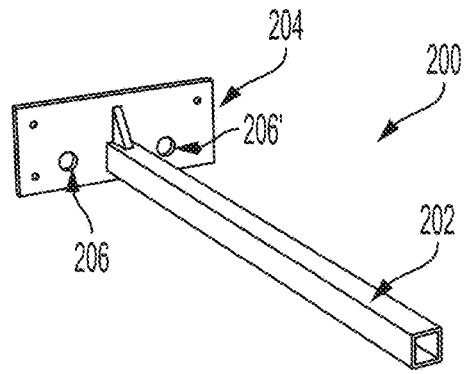
FIG. 2A
FIG. 2B
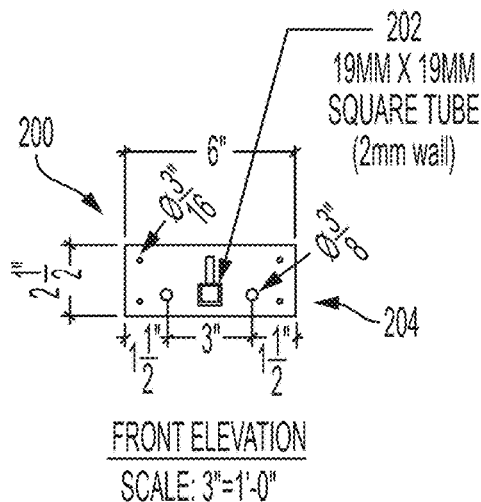
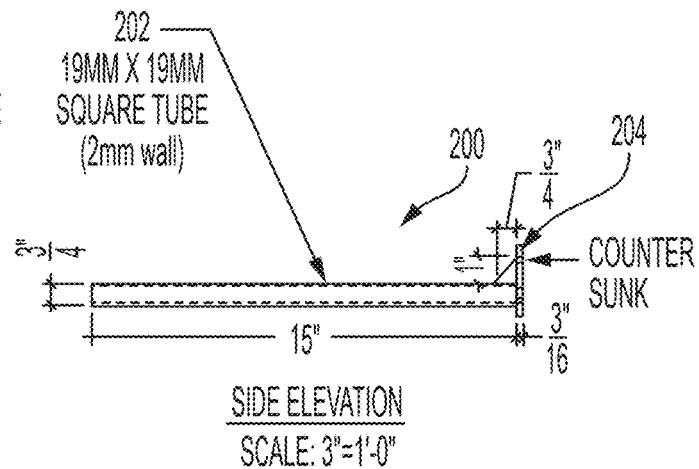
FIG. 2C
FIG. 2D

WALL PANEL FURNITURE SYSTEM

CROSS-REFERENCE TO RELATED APPLICATIONS

This application claims priority to U.S. provisional application No. 63/482,669 filed Feb. 1, 2023 incorporated herein by reference in its entirety.

BACKGROUND OF THE INVENTION

Commercial hospitality venues such as hotels may decide to renovate rooms with new furniture for various reasons. One of the most common reasons is to keep up with changing trends and guest expectations. Over time, furniture can become outdated or worn out, and so hotels may decide to replace it with more modern and stylish pieces that better reflect current design trends. This can help hotels to appeal to a wider range of guests and create a more attractive and welcoming atmosphere.

Another reason that hotels may choose to renovate with new furniture is to improve the overall guest experience. This may involve upgrading the comfort and functionality of the furniture, such as replacing old and uncomfortable beds with more supportive and comfortable models. This can help to increase guest satisfaction and reduce negative reviews, and can also help hotels to attract new guests and maintain their competitive edge. Additionally, some hotels may decide to renovate their rooms as part of a larger renovation project, aimed at updating and refreshing the entire property. This could involve updating all of the furniture, as well as making other improvements such as painting, installing new lighting, or updating bathrooms and kitchens.

Finally, hotels may also choose to renovate rooms with new furniture as a way to increase revenue. For example, they may choose to upgrade rooms in the hope of being able to charge higher rates, or they may choose to add new features and amenities, such as a pull-out sofa or a larger work area, in order to make the rooms more appealing to guests and justify higher prices.

When purchasing room furniture, the aim is often to create a comfortable and functional spaces that meet the needs of guests while also fitting within the hotel's budget and design scheme. One of the most important properties that hotels look for is durability and strength. Hotel furniture needs to be able to withstand frequent use and rough handling, as well as any accidental spills or damage. This means choosing high-quality materials and construction methods that can stand up to daily wear and tear.

Comfort is also a crucial consideration for hotels. Guests expect to be able to relax and sleep comfortably, and so hotel furniture needs to be designed with this in mind. This means choosing beds, chairs, and sofas that are supportive and ergonomically designed. In addition to comfort and durability, hotels also look for furniture that is stylish and fits the overall design scheme of the hotel. This means considering the color, material, and overall look of the furniture to ensure that it fits in with the hotel's brand and aesthetic.

Functionality is another key factor in hotel furniture purchases. Furniture should be easy to clean and maintain, and provide ample storage space for guests. Hotels also look for furniture that can serve multiple purposes, such as beds with built-in storage or desks that can double as a workspace or a dining table.

Another important consideration is cost-effectiveness. Hotels need to be mindful of their budgets, and so they look for furniture that offers good value for money. This means considering the quality and durability of the furniture, as well as the cost of any customization options.

Key to all of these goals is the ability to easily customize the look and arrangement of furniture for different themes, room layouts and customer preferences is a key consideration. This also need to be accomplished in a time effective fashion while minimizing damage to existing structures like walls.

Accordingly, there is a need in the art to provide easily customizable furniture systems that offer a wide breadth of layout flexibility while minimizing damage, noise and time to complete, while keeping in mind the needs for durability, comfort, style, functionality and cost-effectiveness.

SUMMARY OF THE INVENTION

A wall panel furniture system having a first wall panel comprising: a front side, a back side, and an edge along a perimeter, wherein the edge comprises a first vertical edge opposing a second vertical edge, at least one magnet disposed along the first vertical edge, a second plurality of magnets disposed along the second vertical edge, and a first cleat configured in a first recess disposed on a top portion of the back side; a bracket comprising: an elongate support connected to a plate having at least one opening adjacent to the elongate support; and a piece of furniture comprising a first and second connection section, wherein each connection section comprises: a slot opening configured to accept advancement of the elongate support at least partially therethrough, and at least one adjacent securement slot comprising a first fastener, wherein the at least one adjacent securement slot is aligned with the at least one opening adjacent to the elongate support when the elongate support is inserted into the slot opening. In one embodiment, the first wall panel further comprises a second cleat configured in a second recess disposed on a bottom portion of the back side. In one embodiment, the piece of furniture further comprises: a second adjacent securement slot comprising a second fastener and configured on an opposite side of the slot opening. In one embodiment, the bracket further comprises: a second opening opposite the at least one opening. In one embodiment, the first plurality of magnets comprises at least three magnets. In one embodiment, the first plurality of magnets comprises a first magnet configured about halfway up the height of the first wall panel, a second magnet configured above the first magnet closer to a top of the first wall panel, and a third magnet configured below the first magnet closer to the bottom of the first wall panel. In one embodiment, the second plurality of magnets comprises a fourth, fifth and sixth magnet. In one embodiment, the fourth, fifth and sixth magnet are each respectively configured at the same height as the first, second and third magnet. In one embodiment, the elongate support is tubular. In one embodiment, the elongate support has a cross-sectional profile having at least one straight portion. In one embodiment, the elongate support has a square cross-sectional profile. In one embodiment, the bracket is completely surrounded by the piece of furniture and hidden from view on the front side of the first wall panel when fully attached to the first wall panel. In one embodiment, the system includes a backer layer disposed between the plate and the first wall panel. In one embodiment, the system includes a plurality of wall panels, wherein the first wall panel is one of the plurality of wall panels. In one embodiment, the system includes a plurality of brackets, wherein the bracket is one of the plurality of brackets. In one embodiment, the system includes a plurality of pieces of furniture, wherein the piece of furniture is one of the plurality of pieces of furniture. In one embodiment, the piece of furniture is at least one of a bed, headboard, chair, seat, shelf, desk, table, drawer, stand, hang-bar, wardrobe, storage compartment, décor and lighting. In one embodiment, a second plurality of magnets is disposed along the second vertical edge. In one embodiment, a metal strip is disposed along the second vertical edge.

In one embodiment, a furniture mounting system includes a bracket having: an elongate support connected to a plate having at least one opening adjacent to the elongate support; and a piece of furniture comprising a first and second connection section, wherein each connection section includes: a slot opening configured to accept advancement of the elongate support at least partially therethrough, and at least one adjacent securement slot comprising a first fastener, wherein the at least one adjacent securement slot is aligned with the at least one opening adjacent to the elongate support when the elongate support is inserted into the slot opening.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which:

FIGS. 2A-2D are various views of a bracket according to one embodiment.

DETAILED DESCRIPTION OF THE INVENTION

Figure 1D:
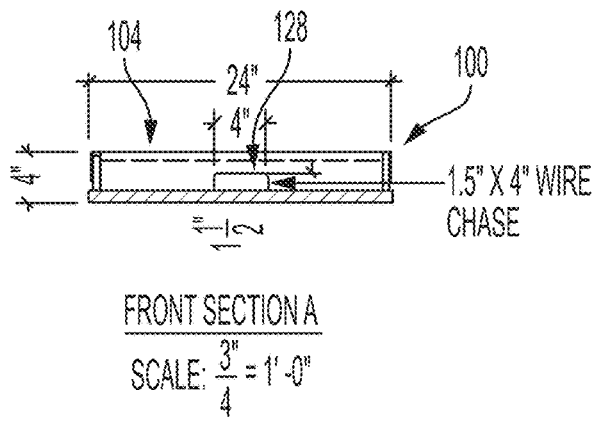
FIGS. 1A-1G are various views of a wall panel according to one embodiment.

It is to be understood that the figures and descriptions of the present invention have been simplified to illustrate elements that are relevant for a more clear comprehension of the present invention, while eliminating, for the purpose of clarity, many other elements found in wall panel furniture systems. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Ranges: throughout this disclosure, various aspects of the invention can be presented in a range format. It should be understood that the description in range format is merely for convenience and brevity and should not be construed as an inflexible limitation on the scope of the invention. Where appropriate, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Referring now in detail to the drawings, in which like reference numerals indicate like parts or elements throughout the several views, in various embodiments, presented herein is a wall panel furniture system.

Wall furniture systems according to the embodiments described herein offer many advantages. Primarily, the system's bracket design allows furniture to mount to the wall panels, providing superior strength in a commercial use environment where durability and structural reliability are key. The easy-to-reconfigure design allows hotels to quickly and easily change the layout of their guest rooms to meet the changing needs of guests or to reflect new design trends. Replacing panels or changing their order or location is a simple change. They also allow for saved space. With built-in storage, compact designs, and multi-functional pieces, modular systems according to these embodiments can help hotels to maximize the use of limited space, which is especially important for hotels in urban areas, where space is at a premium. They are quick and easy to install, minimizing disruptions to guests and getting rooms up and running more quickly. This can help to reduce downtime and improve overall operational efficiency. The panels are removable and can be re-hung in a different order or a different location altogether. They can also be replaced with a new panel and furniture piece as needed, without the need to replace the entire set.

Figure 1E:
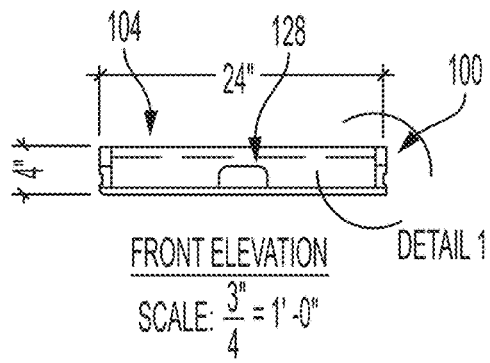
Figure 1F:
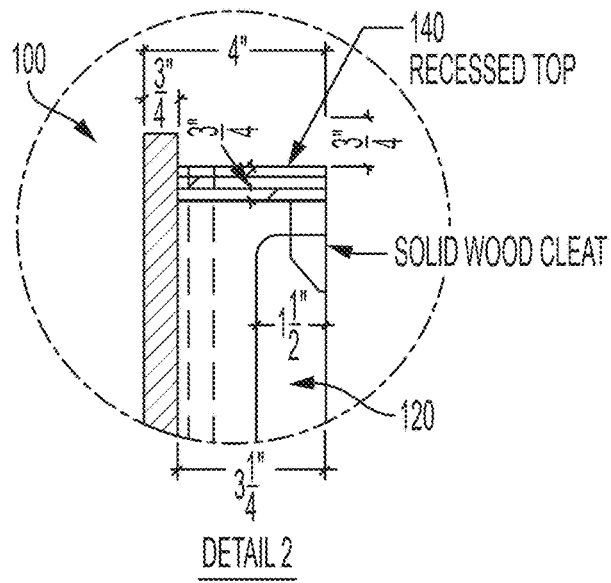
Figure 1G:
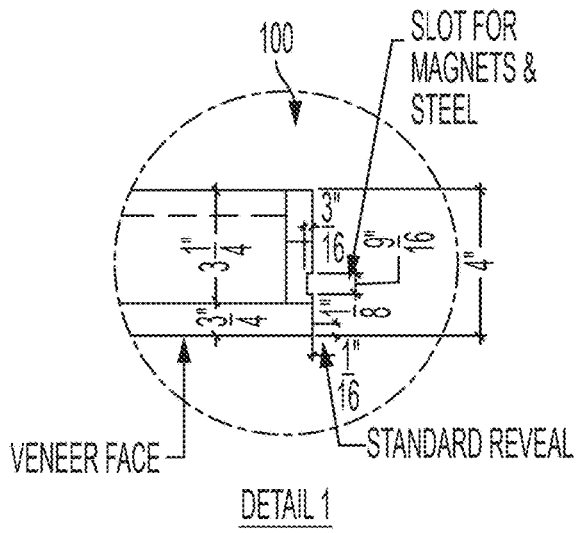
Figure 1H:
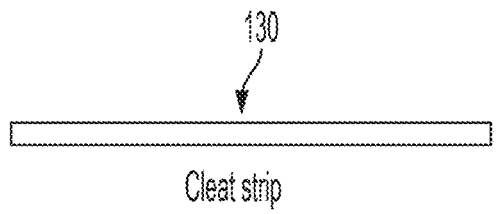

With reference now to FIGS. 1A-1G, a wall panel from an embodiment of a wall panel furniture system is shown according to one embodiment. The wall panel has a front side 102, a back side 104, and an edge 106 separating the front and back side along a perimeter 106'. A first vertical edge on the left 107 opposes a second vertical edge on the right 108. Magnets 110 are disposed along the first and second vertical edges 107, 108. The magnets 110 can align at certain heights (e.g. middle, top and bottom) to align adjacent panels 100. In one embodiment, the magnets 110 are only on one side of each panel 100 while the opposing side has a metal strip, such as a ferromagnetic metal. In this embodiment, the magnet side always mates with a metal strip side via magnetic attraction for closing the gap and aligning panels while allowing for adjustment to varying heights. In one embodiment, each panel can for example have on the left edge an upper magnet and lower metal strip, and on the right edge an upper metal strip and lower magnet. This will also consistently align a magnet/metal strip mating pair. When the panels are brought together, the embedded magnets create a strong, secure bond that holds the panels in place. This helps to ensure that the panels are aligned accurately and evenly, creating a smooth and seamless look. The use of magnets eliminates the need for traditional hardware, such as screws or nails, and allows for a quick and easy installation process. In addition, the use of magnets can make it easier to reconfigure the wall panels if needed. By simply separating the panels, the magnetic bond is broken, allowing the panels to be reassembled in a different configuration. This flexibility can be a major advantage, as it allows users to quickly and easily adapt their rooms to meet changing needs. The wall panels can be constructed from wood and reinforced with metal or steel. Surface materials such as laminate or MDF can be incorporated for aesthetics, and other features like a wire chase 128 can be embedded in the panel layers. The wire chase 128 is advantageously connected to a recessed top 140 so that wires can easily be accessed yet remain out of view from the front. The panels can come pre-drilled with bracket holes to match a pre-ordered furniture layout. Alternatively, the panels can come with no holes and the furniture pieces can include a hole template for drilling on-site.

A cleat 122 is configured in a first recess 120 disposed on a top portion of the back side 104. Additional cleats such as a second lower cleat 124 can be included. The cleats 122, 124 can be used to attach the wall panels 100 to a cleat strip 130 attached to the building wall. The cleat strip 130 and wall panel 130 can be secured using screws, nails, or other fasteners, depending on the type of wall and the weight of the panel. Once the cleat strip 130 is in place, the wall panel 100 can be lifted into place and secured. The advantage of using cleats 122, 124 to connect wall panels 100 to a wall is that they provide a strong and secure connection that can support the weight of the panel 100 and attached furnishings. Additionally, they facilitate easy adjustment or removal, allowing the panels to be repositioned, removed or replaced as necessary.

Figure 3A:
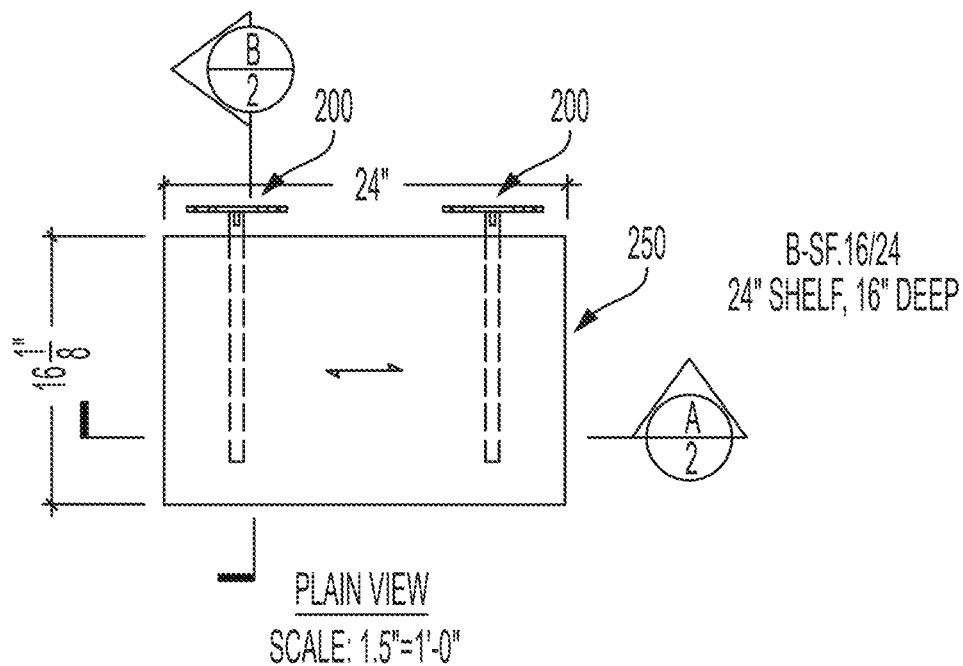
FIGS. 3A-3C are various views of a shelf according to one embodiment.
Figure 3B:
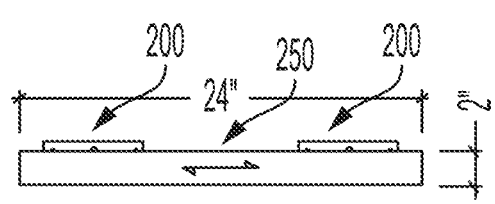
Figure 3C:
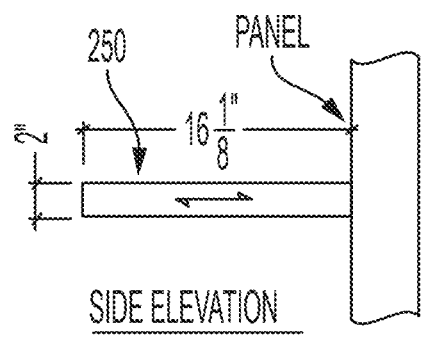
Figure 4A:
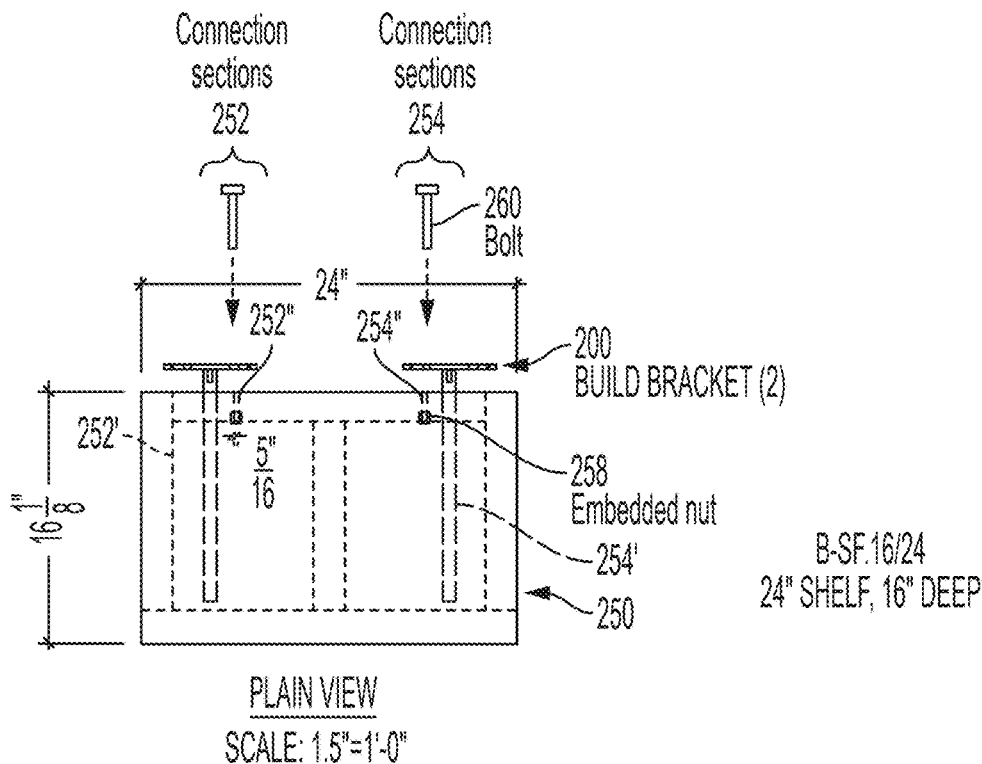
FIGS. 4A-4D are various alternate views of a shelf according to one embodiment.
Figure 4B:
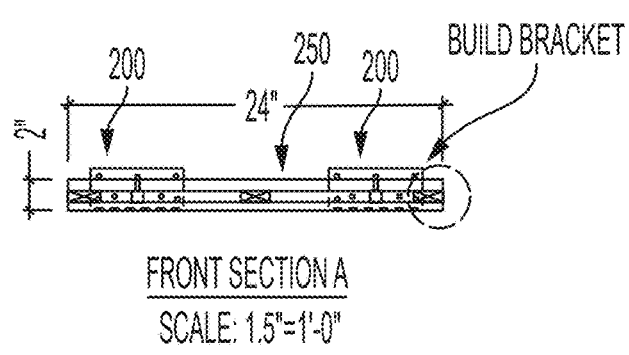
Figure 4C:
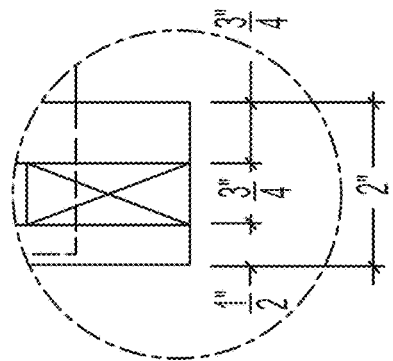
Figure 4D:
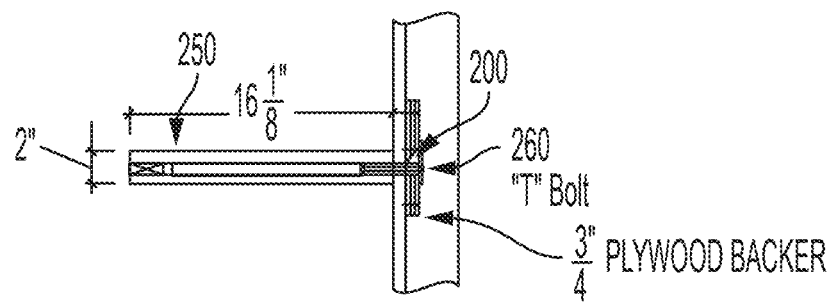

With reference now to FIGS. 2A-2D, 3A-3C, and 4A-4D, a bracket 200 according to one embodiment includes an elongate support 202 connected to a plate 204 having at least one opening 206, 206' adjacent to the elongate support 202. The plate can include one opening, two openings as depicted (206, 206'), or more openings. The support member 202 can be solid, tubular, square, round, or some other shape, for example having one or more flat sides such as triangular or hexagonal. It may also have an irregular profile in certain embodiments.

With particular reference to FIGS. 4A-4D, a piece of furniture such as a shelf 250 has a first and second connection section 252, 254, each section including a slot opening 252', 254' configured to accept advancement of the elongate support at least partially therethrough. Next to each slot opening is at least one securement slot 252", 254", comprising a first fastener such as an embedded nut 258. This securement slot is aligned with the opening in the plate bracket when the elongate support is inserted into the slot opening. One or more additional securement slots and aligned bracket holes can be included (e.g. one on each side as depicted). Since the slot opening for the bracket is completely within the thickness of the furniture structure, the bracket is hidden from view on the front side of the first wall panel when fully attached to the wall panel. Advantageously, the metal bracket runs through the backside of the panel while the bolt 260 pulls the furniture piece into the panel. Thus, the typical screw that is needed in cantilever style brackets (typically secured from below on and partially through the elongate support portion, weakening the support's structural integrity) is eliminated. Instead, the embedded nut 258 allows attachment from behind the panel where the bolt cannot be tampered with, adding a safety and structural integrity benefit. As the bolts are tightened it draws the furniture piece back to the panel while continuing to fully load the support bracket into the slot with the plate flush against the panel. A backer piece such as a plywood backer can be fitted between the plate and the panel to distribute load over a greater area. The sheering weight of the furniture piece is offset by the screw pulling the piece tightly into the panel, while lateral strength is provided by the steel bracket structure itself. Preliminary tests show furniture pieces such as shelves can handle the weight of several hundred pounds without effecting the structural integrity of any part of the system.

Figure 5A:
FIGS. 5A-5D are various views of a wall panel furniture system according to several embodiments.
Figure 5B:
Figure 5C:
Figure 5D:

Systems according to the various embodiments can include various numbers of wall panels depending on the application and room specifications. Examples of finished configurations are show in FIGS. 5A-5D according to several embodiments. The size of the wall panel can be selected based on the size of the room, the type of furniture that will be attached to it, and the overall design scheme of the space. Any windows or doors that may be in the way or other architectural features can be considered. The desired design style of the room can be easily accommodated by selecting furniture and wall panel designs that meet requirements. For example, in a modern or contemporary space, one may choose a panel with clean lines and a simple design. For a more traditional or classical look, a panel with ornate details and a rich finish can be selected. Panels with different design features can be combined to create a combination look, with a variety of materials being used including wood, metal, glass, and more. The system can include hotel furniture known in the art, including but not limited to a bed, headboard, chair, seat, shelf, desk, table, drawer, stand, hang-bar, wardrobe, storage compartment, décor and lighting. In one embodiment, the cantilever mounting hardware can be provided with a furniture piece, but without the wall panel. This may be desirable for example where users want to apply the benefits of the bracket system to an existing wall or structure.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention.

What is claimed is:

1. A wall panel furniture system comprising:
 a first wall panel comprising:
  a front side, a back side, and an edge along a perimeter, wherein the edge comprises a first vertical edge opposing a second vertical edge,
  at least one magnet disposed along the first vertical edge, and
  a first cleat configured in a first recess disposed on a top portion of the back side;
 a bracket comprising:
  an elongate support connected to a plate having at least one opening adjacent to the elongate support; and
 a piece of furniture comprising a first and second connection section, wherein each connection section comprises:
  a slot opening configured to accept advancement of the elongate support at least partially therethrough, and
  at least one adjacent securement slot comprising a first fastener, wherein the at least one adjacent securement slot is aligned with the at least one opening adjacent to the elongate support when the elongate support is inserted into the slot opening.

2. The system of claim 1, wherein the first wall panel further comprises:
a second cleat configured in a second recess disposed on a bottom portion of the back side.

3. The system of claim 1, wherein the piece of furniture further comprises:
a second adjacent securement slot comprising a second fastener and configured on an opposite side of the slot opening.

4. The system of claim 3, wherein the bracket further comprises:
a second opening opposite the at least one opening.

5. The system of claim 1, wherein the first plurality of magnets comprises at least three magnets.

6. The system of claim 5, wherein the first plurality of magnets comprises a first magnet configured about halfway up the height of the first wall panel, a second magnet configured above the first magnet closer to a top of the first wall panel, and a third magnet configured below the first magnet closer to the bottom of the first wall panel.

7. The system of claim 6, wherein the second plurality of magnets comprises a fourth, fifth and sixth magnet.

8. The system of claim 7, wherein the fourth, fifth and sixth magnet are each respectively configured at the same height as the first, second and third magnet.

9. The system of claim 1, wherein the elongate support is tubular.

10. The system of claim 1, wherein the elongate support has a cross-sectional profile having at least one straight portion.

11. The system of claim 1, wherein the elongate support has a square cross-sectional profile.

12. The system of claim 1, wherein the bracket is completely surrounded by the piece of furniture and hidden from view on the front side of the first wall panel when fully attached to the first wall panel.

13. The system of claim 1 further comprising:
a backer layer disposed between the plate and the first wall panel.

14. The system of claim 1 further comprising:
a plurality of wall panels, wherein the first wall panel is one of the plurality of wall panels.

15. The system of claim 1 further comprising:
a plurality of brackets, wherein the bracket is one of the plurality of brackets.

16. The system of claim 1 further comprising:
a plurality of pieces of furniture, wherein the piece of furniture is one of the plurality of pieces of furniture.

17. The system of claim 1, wherein the piece of furniture is at least one of a bed, headboard, chair, seat, shelf, desk, table, drawer, stand, hang-bar, wardrobe, storage compartment, décor and lighting.

18. The system of claim 1 further comprising:
at least a second magnet disposed along the second vertical edge.

19. The system of claim 1 further comprising:
a metal strip disposed along the second vertical edge.

20. A furniture mounting system comprising:
a bracket comprising:
an elongate support connected to a plate having at least one opening adjacent to the elongate support; and
a piece of furniture comprising a first and second connection section, wherein each connection section comprises:
a slot opening configured to accept advancement of the elongate support at least partially therethrough, and at least one adjacent securement slot comprising a first fastener, wherein the at least one adjacent securement slot is aligned with the at least one opening adjacent to the elongate support when the elongate support is inserted into the slot opening.

\* \* \* \* \*